June 9, 1953 C. A. LOVELL 2,641,695

LINEAR RECTIFIER

Filed Dec. 30, 1949 2 Sheets-Sheet 1

INVENTOR
C. A. LOVELL
BY G H Stevenson
ATTORNEY

June 9, 1953 C. A. LOVELL 2,641,695

LINEAR RECTIFIER

Filed Dec. 30, 1949 2 Sheets-Sheet 2

INVENTOR
C. A. LOVELL
BY G H Stevenson
ATTORNEY

Patented June 9, 1953 2,641,695

UNITED STATES PATENT OFFICE 2,641,695

LINEAR RECTIFIER

Clarence A. Lovell, Summit, N. J., assignor to Bell Telephone Laboratories, Incorporated, New York, N. Y., a corporation of New York Application December 30, 1949, Serial No. 135,929

8 Claims. (Cl. 250—27)

This invention relates to alternating-current rectifiers and more particularly to rectifiers for the demodulation of signal-modulated waves.

One object of the invention is to obtain full-wave rectification of an alternating voltage with a high degree of linearity. Another object is to reduce distortion in the demodulation of signal-bearing carrier waves.

For certain applications, for example in the demodulation of multiplex signals, it is necessary that the demodulating device have a high degree of linearity in the relationship between the amplitude of the modulating wave of the carrier and that of the demodulated wave in order to insure freedom from interchannel interference or crosstalk. Since demodulators are essentially non-linear devices, the achievement of a linear demodulation characteristic has always been attended with substantial difficulties and the problem continues to be a critical one in the communication field.

In accordance with the present invention, improved linearity is obtained by the application of reverse feedback in a rectifier circuit in a manner hereinafter described, whereby each half cycle of the received wave is rectified as an undistorted replica of the corresponding half cycle of the impressed wave. The resulting output is a full-wave rectified replica of the input wave, that is, one having an exact correspondence of instantaneous magnitudes with the input wave, but with values all of the same sign. The rectified wave produced in this manner is free from distortion to a very high degree. If the input is a signal-modulated carrier, the modulating signal can be recovered with great fidelity from the rectified wave by proper filtering.

For an explanation of the theory of reverse feedback in reducing distortion in vacuum tube amplifiers, reference may be made to United States Patent 2,102,671, issued to H. S. Black on December 21, 1937.

The rectifier circuit of the present invention consists in general of a pair of high-gain multistage vacuum tube amplifiers with their input circuits connected in push-pull relation to the signal source and with their outputs connected in parallel to a common load resistor. A feature of the circuit is that the voltage across the common load resistor is fed back in the same phase to the input circuits of the two amplifiers through separate feedback paths.

Another feature of the invention is that the initial output voltage, that is, with no input, is always practically zero with respect to ground and can only swing in the negative direction as input is applied.

Another feature is that each amplifier conducts while the other is disabled during alternate half cycles of the input.

Still another feature is that for the amplifier that is conducting the feedback action together with the high gain accurately preserves the original wave form.

The efficacy of the circuit depends upon the amount of over-all gain of the amplifiers as well as upon the application of reverse feedback. Since tubes may be chosen having characteristics such that the amplification of a three-stage amplifier is as high as 30,000 and upwards, a high degree of linearity between output voltage and input voltage is readily obtainable.

The invention will be better understood by reference to the following specification and accompanying drawings, of which:

Figure 1:
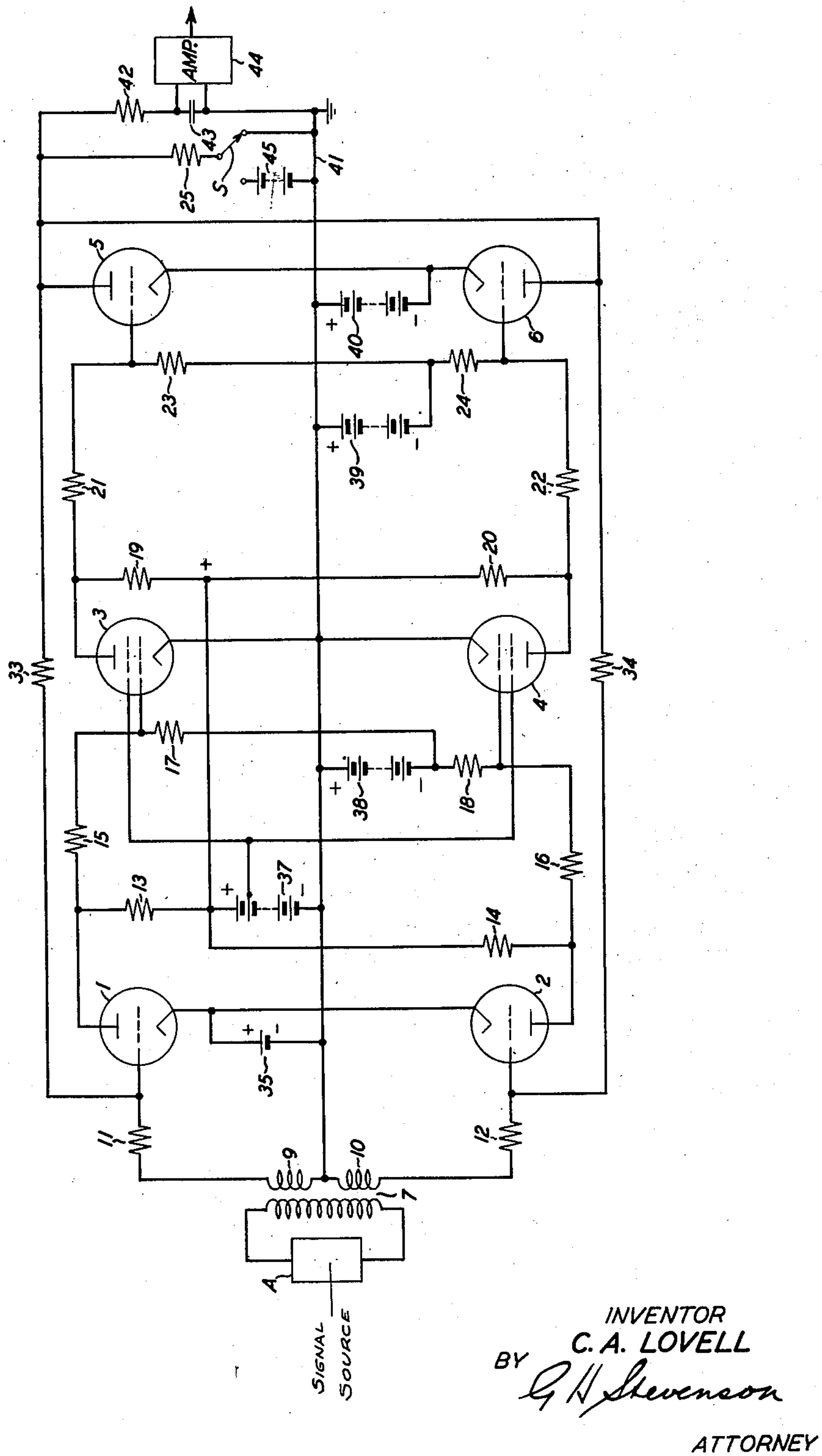
Fig. 1 shows in schematic form an embodiment of the invention.

In Fig. 1 the vacuum tubes 1, 3 and 5 with their associated circuit elements constitute a three-stage reverse feedback amplifier of the type shown in United States Patent 2,401,779, June 11, 1946, to K. D. Swartzell, Jr. Vacuum tubes 2, 4 and 6 with their associated circuit elements constitute a similar amplifier, the corresponding tubes of each amplifier being preferably of the same type and having approximately the same operating characteristics. Tubes 1, 2, 5 and 6 are triodes, while tubes 3 and 4 are shown as screen grid tubes, which are generally to be preferred on account of their high amplification factor, though these may be triodes also. The grids of tubes 1 and 2 are connected through the equal input resistances 11 and 12, respectively, to the respective outer terminals of the equal secondary windings 9 and 10 of transformer 7, the primary of which is connected to source A. The grids of tubes 1 and 2 are negatively biased by battery 35.

The vacuum tube 1 is coupled to tube 3 by means of an interstage coupling network comprising the three resistors 13, 15 and 17. This coupling network is of the type disclosed in United States Patent 1,751,527, March 25, 1930, to H. Nyquist. The coupling between tubes 3 and 5, 2 and 4, and 4 and 6 each comprises a similar series of resistors as shown.

Positive potential from battery 37 is supplied through resistors 13, 14, 19 and 20 to the anodes of tubes 1, 2, 3 and 4, respectively, and the screen grids of tubes 3 and 4 are connected to a suitable tap on battery 37. Resistors 15 and 17 are connected in series between the anode of tube 1 and the negative terminal of battery 38, thereby forming a voltage divider capable of supplying a positive or a negative voltage depending upon the relative values of their resistances. The junction point of the resistors is connected to the control grid of tube 3, their relative resistances and the voltage of battery 38 being so chosen that a suitable negative bias is supplied to the grid. The voltage divider also causes a fraction only of the output signal voltage of tube 1 to be delivered to tube 3, the fraction being the ratio of resistance 17 to the sum of resistances 15 and 17. In a similar manner the resistors 16 and 18 are connected and proportioned to supply an equal negative bias to the control grid of tube 4, and likewise a suitable negative bias is supplied respectively to the grids of tubes 5 and 6 by means of resistors 21 and 23, and resistors 22 and 24, the junction of resistors 23 and 24 being connected to the negative terminal of battery 39.

The cathodes of tubes 5 and 6 are connected together and supplied with negative potential from battery 40. The anodes are connected together and to one terminal of the load resistor 25. The other terminal of the load resistor may be connected by means of switch S either to ground or to the positive terminal of battery 45, which has its negative terminal grounded. The conductor 41 supplies ground potential to the negative terminals of batteries 35, 37 and 45, the positive terminals of batteries 38, 39 and 40, the cathodes of tubes 3 and 4, and the junction of secondary windings 9 and 10.

The anodes of tubes 5 and 6 are connected by resistor 33 to the control grid of tube 1 and by an equal resistor 34 to the control grid of tube 2, thus feeding back voltage from the common output circuit of tubes 5 and 6 to the input circuits of tubes 1 and 2.

In shunt with resistor 25 there are connected in series relation resistor 42 and condenser 43. The amplifier 44 is connected to amplify the voltage across condenser 43.

The circuit should be initially adjusted with no input from source A and with the feedback paths including resistor 33 and 34 temporarily opened. Under these conditions tubes 1, 2, 3 and 4 should be biased to operate as class A amplifiers, so that the operating range of each is over a practically linear portion of its plate current-grid voltage characteristic. The adjustment of tubes 5 and 6 will depend upon whether resistor 25 is connected to battery 45 or to ground. For the purposes of the invention this battery may be omitted, but there may be circumstances which make its presence desirable. In either case, assuming that battery 40 has been chosen large enough for the required output voltage, the bias on tubes 5 and 6 should be adjusted so that their combined currents flowing through resistor 25 will result in an anode voltage that is approximately zero with respect to ground. This adjustment is not at all critical, however. If battery 45 is omitted it will generally be more practicable to adjust for a small negative anode voltage rather than to attempt to find the zero point; otherwise, for zero or for either a small positive or negative voltage. Even if these voltages are substantial the circuit will still function satisfactorily.

When the feedback resistors 33 and 34 are again connected, whatever anode voltage exists on tubes 5 and 6 as a result of the above adjustments will be fed back to the grids of tubes 1 and 2. If this voltage is positive, for example, which can only occur when battery 45 is connected, it will result in an amplified positive input voltage on the grids of tubes 5 and 6, which will increase the current flowing through resistor 25 and thereby decrease the positive anode voltage. A smaller positive voltage will then be fed back, this action continuing in the well-known manner until the anode voltage is reduced to practically zero. If the initial anode voltage is negative, the fed-back and amplified negative voltage on the grids of the output tubes will reduce the current flowing through resistor 25, and a smaller negative voltage will be fed back, this action continuing until the anode voltage is again zero. Thus the anode voltage will be zero when the voltage drop across resistor 25 is equal to the voltage of battery 45, or, if the battery is omitted, when the current through resistor 25 is reduced to practically zero.

The above adjustments having been made, the circuit will be ready to receive an input from source A. When an input is applied, the output tubes 5 and 6 will each conduct during alternate half cycles of the input wave, these being the positive half cycles, and the output voltage will start from zero at approximately the same instant that the input voltage starts from zero and will follow the form of the input wave without appreciable distortion throughout the half cycle. It will be seen that the output voltage, being due to an increased flow of current in resistor 25, will always be negative with respect to ground.

If battery 45 is connected, in which case there must be an initial flow of current through tubes 5 and 6 and resistor 25 in order to make the anode voltage zero, there can be no output voltage due to input until one of the output tubes is brought to plate current cut-off, since the increase of current through one tube is balanced by the decrease through the other tube, the total current remaining constant. This means that at the start of a half cycle the output voltage remains zero for a short time and does not immediately begin to follow the input voltage, thereby causing a degree of distortion. However, on account of the high over-all amplification factor assumed there will be only an insignificant rise in input voltage before one of the output tubes is brought to cut-off, thus making the distortion due to this effect entirely negligible. Thereafter, until near the end of the half cycle when the same small effect occurs agin, the combination of feedback and high gain results in an output voltage that is linearly proportional to the input voltage. Furthermore, these characteristics of the circuit, reverse feedback together with very high amplification, make it unnecessary that the two amplifiers have exactly the same gain or that the corresponding tubes have exactly the same operating characteristics.

Figure 2:
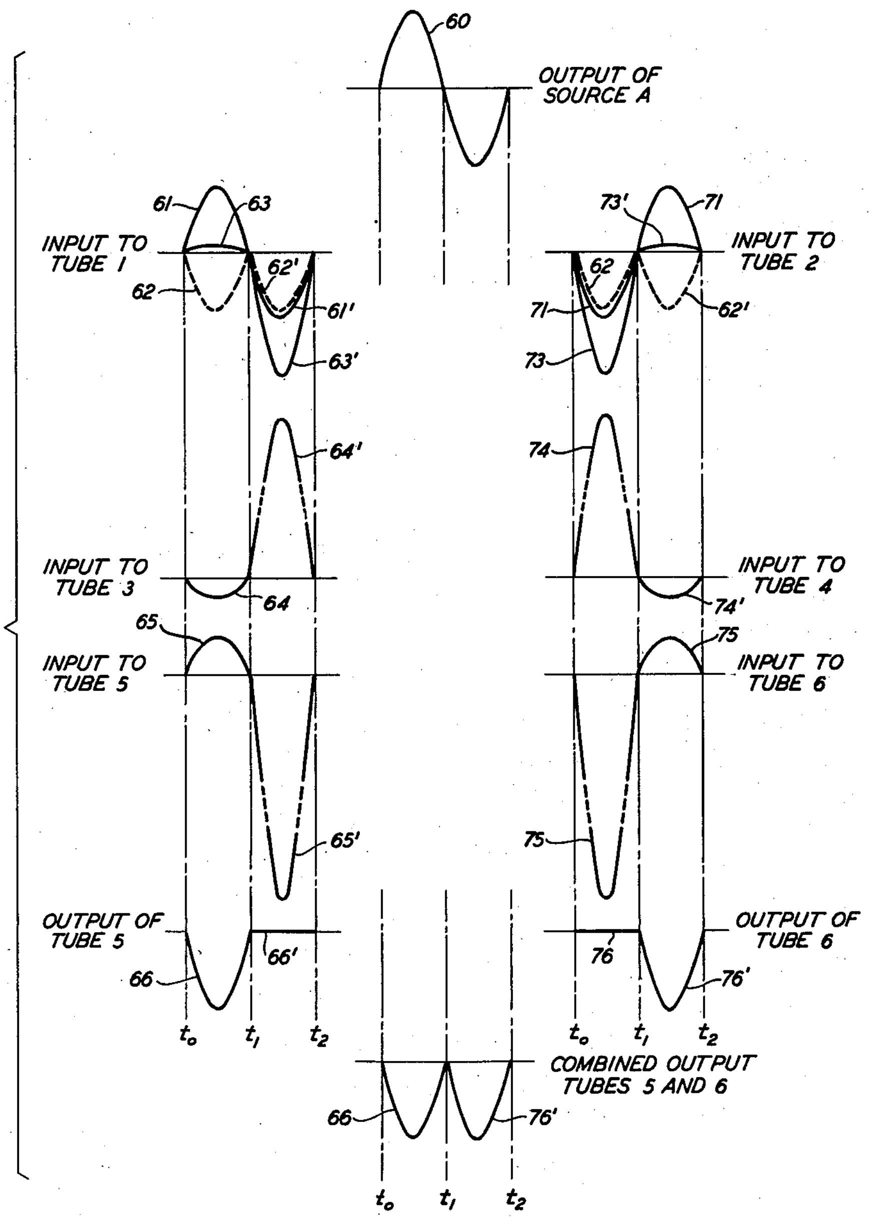
Fig. 2 illustrates the voltage wave forms at various points in the circuit of Fig. 1.

An understanding of the operation of the circuit will be aided by reference to Fig. 2, which applies to the case where resistor 25 is connected to ground instead of to battery 45 and the output tubes are initially at cut-off. For purposes of explanation it will be assumed that source A of Fig. 1 is supplying a simple sine wave to the primary of transformer 7, one complete cycle of which is represented by 60 in Fig. 2. Then two waves of equal amplitude and opposite polarity will be generated in the secondary windings 9 and 10, and some fraction of the voltage across winding 9 will exist between the grid of tube 1 and ground, which may be represented by 61, 61', and an equal fraction of the voltage across winding 10 will exist between the grid of tube 2 and ground, represented by 71, 71'. Due to the feedback circuit, some fraction of the voltage developed across output resistor 25 will also be applied to the grid of tube 1, this being represented by 62, 62', and the same voltage will be applied to the grid of tube 2. As explained above, this voltage will always be negative. If the resistance of 33 is made equal to that of 11 (and 34 equal to 12), the magnitude of the applied feedback voltage will be only slightly less than that of the applied voltage from the transformer winding 9 or 10. The resultant voltage on each grid will therefore be the algebraic sum of the two applied voltages, this being represented by 63, 63' for grid 1 and by 73, 73' for grid 2. It is seen from Fig. 2 that during the first half cycle the resultant on the grid of tube 1 is a very small positive voltage (63), being the difference between the two applied voltages, and on the grid of tube 2 it is a larger negative voltage (73), being the sum of the separate applied voltages, these conditions being reversed during the next half cycle, giving the voltages 63' and 73'.

Considering first the course of events during the first half cycle, from time $t_0$ to time $t_1$, the small resultant positive input 63 to tube 1 will give rise to an amplified negative input 64 to tube 3, and this in turn to a larger positive input 65 to tube 5. This will cause current to flow in tube 5, which was initially non-conducting, resulting in a negative voltage drop across resistor 25, represented by 66. This negative voltage is fed back through resistor 33 to the grid circuit of tube 1, the fraction of this voltage existing between grid and ground being the voltage represented by 62 as stated above.

During the same (first) half cycle the resultant negative voltage 73 on the grid of tube 2 is amplified and causes a large positive input 74 to tube 4, which is in turn amplified and gives rise to a large negative input 75 to tube 6. Since the grid of tube 6 is already at cut-off, this tube will remain non-conducting and its current will be zero throughout the half cycle, during which time its contribution to the output voltage will also be zero, as represented by 76.

During the second half cycle, from time $t_1$ to time $t_2$, the roles of the two amplifiers are reversed. The resultant voltage on the grid of tube 1 is now the negative voltage 63', which is amplified and results in a positive input 64' to tube 3, this in turn being amplified and giving rise to a large negative input 65' to tube 5. Since this tube is already at cut-off, its plate current will remain zero throughout the half cycle, and its contribution to the output voltage will be zero as represented by 66'. On the other hand, the resultant voltage on the grid of tube 2 during the second half cycle is the small positive voltage 73'. This is amplified and causes a larger negative input 74' to tube 4, which is further amplified to produce the positive input 75' to tube 6. This causes current to flow in tube 6 and resistor 25, producing the negative output voltage 76' which is fed back through resistor 34 to the grid circuit of tube 2, the fraction thereof appearing on the grid being represented by 62'.

It is thus seen that the combined output voltage wave consists of a succession of negative half cycles as 66, 76', shown in the lower part of Fig. 2. Due to the high amplification of the two amplifiers and the large amount of reverse feedback, the amplitude of the output wave, for each half cycle, will be linearly proportional in high degree to the input wave 60; that is, the ratio of the instantaneous amplitudes of output and input will be constant.

Now if the input from a source A is a carrier wave modulated by a signal wave, the output 66, 76' will consist of a succession of undistorted half cycles varying in amplitude in accordance with the signal, and the envelope of these half cycles will represent the signal. To eliminate the carrier wave and obtain a wave representing the envelope, and hence the signal, the output voltage across resistor 25 under these conditions may be integrated by capacitor 43 in series with resistor 42 (Fig. 1), their values being chosen to provide a suitable time constant. The voltage across the capacitor will then represent the signal, which may be amplified by amplifier 44.

It is to be understood that the above-described arrangement is illustrative of the principles of the invention. Other arrangements may be devised by those skilled in the art without departing from the spirit and scope of the invention.

What is claimed is:

1. In combination, a source of signal-modulated waves, a load resistor, two high gain amplifiers with their inputs connected in push-pull to said source and with their outputs connected in parallel to said load resistor, two equal resistors connecting the same side of said load resistor to points of respectively opposite phase in said inputs, and an integrating circuit connected to said load resistor.

2. The combination specified in claim 1 wherein said amplifiers are multistage vacuum tube amplifiers, the output tubes of which are biased to approximately the plate current cut-off point and the remaining tubes biased to operate over a substantially linear portion of their plate current-grid voltage characteristics, said bias adjustments being made before said signal source and said equal resistors are connected.

3. A detector of signal-modulated waves comprising in combination two multistage resistance-coupled vacuum tube amplifiers, a load resistor, a source of direct current having its negative pole connected to the respective cathodes of the output tubes of said amplifiers and its positive pole connected to one terminal of said load resistor, a direct connection between the other terminal of said resistor and the respective anodes of said output tubes, separate circuits for feeding back in the same phase a portion of the output voltage to the respective input circuits of said amplifiers, said feedback circuits each including a resistor, a circuit for applying said waves in push-pull to the input terminals of said amplifiers, and an integrating circuit connected to said load resistor.

4. The combination specified in claim 3 wherein the output tubes of said amplifiers are biased to approximately the plate current cut-off point and the remaining tubes biased to operate over a substantially linear portion of their plate current-grid voltage characteristics, said bias adjustments being made with said feedback circuits open and with the source of said signal waves disconnected from said input circuits.

5. In combination, a source of alternating current, a load resistor, two multistage resistance-coupled vacuum tube amplifiers with their inputs connected in push-pull to said source and with their outputs connected in parallel to said load resistor, and two equal resistors connecting the same side of said load resistor to points of respectively opposite phase in said inputs.

6. The combination specified in claim 5 wherein the output tubes of said amplifiers are biased to approximately the plate current cut-off point and the remaining tubes biased to operate over a substantially linear portion of their plate current-grid voltage characteristics, said bias adjustments being made with said source and said equal resistors disconnected from said input circuits.

7. A full-wave linear rectifier of alternating current comprising in combination two multi-stage resistance-coupled vacuum tube amplifiers, a load resistor, a source of direct current having its negative pole connected to the respective cathodes of the output tubes of said amplifiers and its positive pole connected to one terminal of said load resistor, a direct connection between the other terminal of said resistor and the respective anodes of said output tubes, separate circuits for feeding back in the same phase a portion of the voltage developed across said load resistor to the respective input circuits of said amplifiers, said feedback circuits each including a resistor, and a circuit for connecting the input terminals of said amplifiers in push-pull to the source of said alternating current.

8. The combination specified in claim 7 wherein the output tubes of said amplifiers are biased to approximately the plate current cut-off point and the remaining tubes biased to operate over a substantially linear portion of their plate current-grid voltage characteristics, said bias adjustments being made with said feedback circuits opened and with said source of alternating current disconnected from said input circuits.

CLARENCE A. LOVELL.

References Cited in the file of this patent

UNITED STATES PATENTS

| Number | Name | Date |
|---|---|---|
| 1,749,841 | Nyquist | Mar. 11, 1930 |
| 2,273,997 | Rubin | Feb. 24, 1942 |
| 2,300,133 | Nyquist | Oct. 27, 1942 |
| 2,325,927 | Wilbur | Aug. 3, 1943 |
| 2,542,160 | Stoner et al. | Feb. 20, 1951 |